3,306,717
FILLER METAL FOR WELDING ALUMINUM-
BASED ALLOYS
Nils Erik Lindstrand and Per-Olof Aronson, Finspang, Sweden, assignors to Aktiebolaget Svenska Metallverken, Vasteras, Sweden, a joint-stock company limited of Sweden
No Drawing. Filed Feb. 14, 1964, Ser. No. 344,837
8 Claims. (Cl. 29—197)

The present invention relates to a filler metal for welding aluminum-based alloys, preferably of the type AlZnMg.

Alloys of the type AlZnMg with relatively high Zn- and Mg-contents and additions of Cu, have long been in use as high strength alloys especially in the aircraft industry. A great disadvantage of these alloys, however, is their low resistance to corrosion and their unsuitability for welding.

During recent years there has been developed weldable, Cu-free alloys with Zn- and Mg-contents (about 5% Zn and 1% Mg) which are lower than the conventional known alloys. These weldable alloys in welded condition are the strongest commercially available aluminum alloys. The resistance to corrosion of the base metal is good, but since the alloys are especially intended for welded constructions and the resistance to stress corrosion of the weld is substantially lower, the utility of the alloys is limited.

As a filler metal for welding, alloys with about 5% Si or about 5% Mg or ternary AlMgSi-alloys have been used. Of these, AlMg-alloys with about 5% Mg are the most frequently used since the greatest strength is attained thereby.

For the purpose of improving the resistance to stress corrosion of the base metal, additions of many different elements have been tried. Such, for example, is Ag. By using 0.3–0.8% Ag in the base metal, certain improvements of the strength have been obtained in the alloy types and a better resistance to stress corrosion is also obtained.

Tests, on which the invention is based, have confirmed the previously observed effect of Ag on the increased strength in artificial ageing. In addition, these tests also proved that (a) liability to crack during welding is not influenced by additions of Ag up to 0.4%; (b) the strength of normally welded material rises with the addition of Ag; (c) resistance to stress corrosion in welds increases considerably with the addition of Ag.

Of the above mentioned advantages, (c) is highly essential, but as a suitable addition of silver in the base metal (about 0.3%) increases the expense of the alloy, this method of increasing the resistance to corrosion is of only small practical interest.

The inventors have made stress corrosion tests on welds effected on known AlZnMg-alloys, both with and without additions of Ag. The Ag-free alloy (alloy A) had the following percentage composition by weight:

| | Percent |
|---|---|
| Mg | 1.2 |
| Zn | 4.9 |
| Cr | 0.17 |
| Mn | 0.24 |

Remainder being Al of commercial quality.

The Ag-containing alloys contained in addition 0.24 and 0.40% Ag, respectively (alloys B and C).

An Ag-free welding wire of an AlMg-alloy with 5% Mg was used as filler metal.

To produce the pieces intended for the stress corrosion tests two bars with a cross-section of 3 x 100 mms. were TIG-welded (tungsten (inert gas, non-conducting welding wire) with a butt I-joint. From the weld thus obtained, test pieces were taken with a width of 10 mm. at right angles to the direction of welding. The test piece was subjected to the following different heat treatments:

(1) Natural ageing→welding→artificial ageing
(2) Artificial ageing→welding→artificial ageing
(3) Artificial ageing→welding→natural ageing The following testing of the stress corrosion was carried out by outdoor exposure in mild industrial atmosphere under a constant tensile stress of 31.5 kgs./mm.² (22.4 tons per square inch). Four tests were taken from each specimen, from which the average length of life in days was calculated. In those cases where all four test bodies had not broken within the test period, the sign ">" has been put in front of the value in the table. The results are shown in Table 1 below.

TABLE 1.—AVERAGE LENGTH OF LIFE IN DAYS

| | Heat treatment | | |
|---|---|---|---|
| | 1 | 2 | 3 |
| Alloy A | 18 | 20 | 4 |
| Alloy B | 43 | 65 | >75 |
| Alloy C | >78 | >91 | >63 |

From the table it is clear that the presence of Ag in the base metal substantially reduces the tendency of stress corrosion in the welded material. In this type of stress corrosion testing, there arose in the welding material itself initiate fractures owing to brittleness. The fractures proved on examination under a microscope to be intercrystalline. The investigations carried out by the inventors thus showed that the composition of the welding material is critical for the stress corrosion resistance of the weld and therefore it was concluded that a filler metal containing silver should be used for welding aluminum alloys.

According to the invention it has been found that aluminum alloys, especially of the type AlZnMg, which are welded with a normal filler metal which in addition contains Ag, provides welds with a substantially reduced tendency to stress-corrosion. A filler metal for welding aluminum alloys of the kind in question is characterized according to the invention in that it contains 2–8% Mg and/or Si in a quantity up to 8%, at least one element selected from the group consisting of Cu, Mn, Cr, B, Ti, V and Li in a combined quantity of up to 5%, Ag in a quantity of 0.1–10% the remainder being Al and impurities normally present in it.

According to one embodiment of the invention, the filler metal contains 3–8% Mg and 0.3–3% Ag. A suitable percentage composition by weight is the following:

| | Percent |
|---|---|
| Mg | 3–8 |
| Mn | Up to 1.0 |
| Cr | Up to 1.0 |
| Cu | Up to 0.5 |
| Zr | Up to 0.1 |
| B | Up to 0.1 |
| Ti | Up to 0.5 |
| V | Up to 0.5 |
| Li | Up to 0.1 |
| Ag | 0.5–2.5 |

Al, remainder (including impurities normally present)

According to another embodiment of the invention, the filler metal contains 3–8% Si and 0.3–3% Ag. A suitable percentage composition by weight is the following:

| | Percent |
|---|---|
| Si | 3–8 |
| Mn | Up to 1.0 |
| Cr | Up to 1.0 |
| Cu | Up to 0.5 |
| Zr | Up to 0.1 |
| B | Up to 0.1 |
| Ti | Up to 0.5 |
| V | Up to 0.5 |
| Li | Up to 0.1 |
| Ag | 0.5–2.5 |

Al, remainder (including impurities normally present)

A filler metal according to the invention, where both Mg and Si are present, contains preferably 2–8% Mg, 0.5–3% Si and 0.3–3% Ag.

EXAMPLE

A filler metal according to the invention in the form of a welding wire was produced from an AlMg-alloy containing 5% Mg and 0.9% Ag. Two 3 x 100 mm. bars were TIG-welded with an I-butt joint with this welding wire. Samples were taken at right angles to the weld. The base metal was a known AlZnMg-alloy of the following composition:

| | Percent |
|---|---|
| Zn | 4.6 |
| Mg | 1.2 |
| Cr | 0.17 |
| Mn | 0.25 |

The remainder being Al of commercial quality.

For comparison, test material of the same alloy was welded with a welding wire of the same composition as the above but without the addition of Ag. The welded test pieces were subjected to outdoor exposure under a constant stress. Each test material comprises four test pieces for which the average length of life was calculated. The results are shown in Table 2 below.

TABLE 2

*Average length of life in days—Stress 30 kg./mm.²*

| | |
|---|---|
| Welding wire without Ag | 3 |
| Welding wire with 0.9% Ag | 7.5 |

It should be noted that the values in Table 2 are not directly comparable with the values in Table 1 as the tests were carried out at different times. A comparison between the results obtained for the Ag-free and the Ag-containing welding wire from this test series carried out under mutually identical conditions, however, shows that with an Ag-containing welding wire according to the invention superior results are obtained with regard to the resistance to the stress corrosion.

The reason that in this preferred example an Ag-content of 0.9% was chosen in the filler metal intended for welding an (Ag-free) AlZnMg-alloy is dependent on the fact that in welding the dilution is such that roughly the same Ag-content is obtained in the weld metal as though the welding were carried out with an Ag-free filler metal on a base metal of the same composition but with an addition of 0.4% Ag.

It has been hereinbefore mentioned that the risk of stress corrosion in welded material of the type AlZnMg causes a limitation of its use. As a result of the filler metal suggested according to the invention which is based on an alloy normally used for this purpose to which silver is added, it has now become possible to minimize the risk of stress corrosion thereby extending the use of AlZnMg alloys.

The filler metal according to the invention is normally used in the form of a non-conductive welding wire or welding rod, or as a conductive wire or rod-shaped electrode.

The silver in a wire or rod-shaped filler metal according to the invention need not be alloyed in the base alloy but can of course be applied in another manner e.g. as compound material. The silver can thus be applied as a homogeneous layer of even thickness on the exterior of a core of an Ag-free alloy of the remaining components, or the silver can form a core within a casing of an Ag-free alloy of the remaining components. Even if according to the preferred embodiment of the invention, the silver is present as an alloying component in the base alloy used for the filler metal, the last mentioned embodiment also lies within the scope of the invention.

What is claimed is:

1. A filler metal for welding aluminum base alloys, said filler metal consisting essentially of 2–8% Mg, Si in effective amount up to 8%, at least one element in effective amount selected from the group consisting of Cu, Mn, Cr, Zr, B, Ti, V and Li an a combined quantity of up to 5%, and 0.1–10% Ag, the remaider being Al and the impurities normally present therein.

2. A filler metal as claimed in claim 1, wherein the Mg is present in an amount of 3–8% and the Ag is present in an amount of 0.3–3% by weight.

3. A filler metal as claimed in claim 1, wherein the elements thereof are present in the following percentage composition by weight:

| | Percent |
|---|---|
| Mg | 3–8 |
| Mn | Up to 1.0 |
| Cr | Up to 1.0 |
| Cu | Up to 0.5 |
| Zr | Up to 0.1 |
| B | Up to 0.1 |
| Ti | Up to 0.5 |
| V | Up to 0.5 |
| Li | Up to 0.1 |
| Ag | 0.5–2.5 |

Al, the remainder to 100%.

4. A filler metal as claimed in claim 1, wherein the Si is present in an amount of 3–8% and the Ag is present in an amount of 0.3–3% by weight.

5. A filler metal as claimed in claim 1, wherein the Mg is present in an amount of 2–8%, the Si in an amount of 0.5–3% and the Ag in an amount of 0.3–3% by weight.

6. A filler metal as claimed in claim 1, wherein the Mg is present in an amount of 5% and the Ag in an amount of 0.9% by weight.

7. A filler metal for welding aluminum base alloys, said filler metal consisting essentially of 2–8% Mg, Si in effective amount up to 8%, at least one element in effective amount selected from the group consisting of Cu, Mn, Cr, Zr, B, Ti, V and Li in a combined quantity of up to 5%, the remainder being Al and the impurities normally present therein, said filler metal having a coat of Ag in such amount that on melting the composite will have a homogeneous silver content between 0.10 and 10% Ag.

8. A filler metal for welding aluminum base alloys, said filler metal consisting essentially of 2–8% Mg, Si in effective amount up to 8%, at least one element in effective amount selected from the group consisting of Cu, Mn, Cr, Zr, B, Ti, V and Li in a combined quantity of up to 5%, the remainder being Al and the impurities normally present therein, and a core of Ag in said filler metal in such amount that on melting the composite will have a homogeneous silver content between 0.10 and 10% Ag.

References Cited by the Examiner

UNITED STATES PATENTS

| | | | |
|---|---|---|---|
| 1,563,079 | 11/1925 | Fontane | 75—145 |
| 2,569,149 | 9/1951 | Brennan | 29—197 |
| 2,916,815 | 12/1959 | Donkervoort | 75—138 |

FOREIGN PATENTS

| | | |
|---|---|---|
| 468,001 | 6/1937 | England. |
| 472,248 | 9/1937 | England. |

HYLAND BIZOT, *Primary Examiner.*